United States Patent
Chai et al.

(10) Patent No.: US 10,402,119 B2
(45) Date of Patent: Sep. 3, 2019

(54) DATA FORMAT CONVERSION APPARATUS AND METHOD AND BUFFER CHIP

(71) Applicant: HUAWEI TECHNOLOGIES CO., LTD., Shenzhen, Guangdong (CN)

(72) Inventors: Shougang Chai, Shanghai (CN); Wenliang Liang, Shanghai (CN); Liang Zhuang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 15/789,011

(22) Filed: Oct. 20, 2017

(65) Prior Publication Data
US 2018/0039446 A1 Feb. 8, 2018

Related U.S. Application Data

(63) Continuation of application No. PCT/CN2015/077311, filed on Apr. 23, 2015.

(51) Int. Cl.
*G06F 13/00* (2006.01)
*G06F 3/06* (2006.01)
(Continued)

(52) U.S. Cl.
CPC .......... *G06F 3/0656* (2013.01); *G06F 3/0613* (2013.01); *G06F 3/0673* (2013.01);
(Continued)

(58) Field of Classification Search
None
See application file for complete search history.

(56) References Cited

U.S. PATENT DOCUMENTS 6,762,762 B2 * 7/2004 MacInnis ............... G06T 9/00
345/503
2008/0175137 A1 7/2008 Tseng et al.
(Continued)

FOREIGN PATENT DOCUMENTS

CN 1606353 A 4/2005
CN 101231865 A 7/2008
(Continued)

OTHER PUBLICATIONS

International Search Report dated Jan. 20, 2016 in corresponding International Patent Application No. PCT/CN2015/077311.
(Continued)

*Primary Examiner* — Sean D Rossiter
(74) *Attorney, Agent, or Firm* — Staas & Halsey LLP (57) ABSTRACT

The present disclosure provides a data format conversion apparatus and method, and a buffer chip. The data format conversion apparatus is disposed on the buffer chip in a memory; a control module is disposed for sending a control instruction to a conversion module when obtaining a data copy command; and a conversion module is disposed for completing data format conversion and storage address mapping on to-be-converted data according to the received control instruction. In this way, a prior-art problem of additionally occupying computing resources and computation time of an accelerated computation unit due to a data format conversion unit disposed in the accelerated computation unit is avoided, the amount of data transmission between a main memory and a device memory is reduced without additionally occupying computing resources, and the computation precision is ensured while the computation efficiency is improved.

18 Claims, 6 Drawing Sheets

(51) Int. Cl.
*G06F 12/00* (2006.01)
*G06F 9/30* (2018.01)
*G06F 7/00* (2006.01)
*G06F 9/38* (2018.01)

(52) U.S. Cl.
CPC .............. *G06F 7/00* (2013.01); *G06F 9/3004* (2013.01); *G06F 9/30014* (2013.01); *G06F 9/30025* (2013.01); *G06F 9/3881* (2013.01); *G06F 12/00* (2013.01)

(56) References Cited

U.S. PATENT DOCUMENTS

| 2009/0077011 | A1  | 3/2009  | Natarajan et al. |
| 2011/0320804 | A1* | 12/2011 | Chan ................. G06F 12/0862 713/150 |
| 2013/0311753 | A1  | 11/2013 | Kandadai |
| 2014/0019720 | A1  | 1/2014  | Sprangle et al. |
| 2017/0126780 | A1* | 5/2017  | Freitag ................. G06F 3/0604 |
| 2018/0150240 | A1* | 5/2018  | Bernat ................ H04L 41/0816 |
| 2019/0004738 | A1* | 1/2019  | Wu ....................... G06F 3/0661 |

FOREIGN PATENT DOCUMENTS

| CN | 102089741 A | 6/2011 |
| CN | 103257847 A | 8/2013 |
| CN | 104364755 A | 2/2015 |
| JP | 2000200173 A | 7/2000 |

OTHER PUBLICATIONS

Written Opinion of the International Searching Authority dated Jan. 20, 2016 in corresponding International Patent Application No. PCT/CN2015/077311.

Office Action, dated May 27, 2019, in Chinese Application No. 201580076244.0 (5 pp.).

* cited by examiner

DATA FORMAT CONVERSION APPARATUS AND METHOD AND BUFFER CHIP

CROSS-REFERENCE TO RELATED APPLICATIONS

This application is a continuation of International Application No. PCT/CN2015/077311, filed on Apr. 23, 2015, the disclosure of which is hereby incorporated by reference in its entirety.

TECHNICAL FIELD

Embodiments of the present disclosure relate to computer technologies, and in particular, to a data format conversion apparatus and method, and a buffer chip.

BACKGROUND

A high-performance computer architecture is usually provided with an accelerated computation unit having a very strong capability of processing an intensive computation task, such as a general purpose graphics processing unit (GPGPU) and a field-programmable gate array (FPGA). When processing an intensive computation task, a central processing unit (CPU) allocates a large amount of parallel computing work to an accelerated computation unit to alleviate computing pressure of the CPU, so as to improve overall computing efficiency of the computer.

Figure 1:
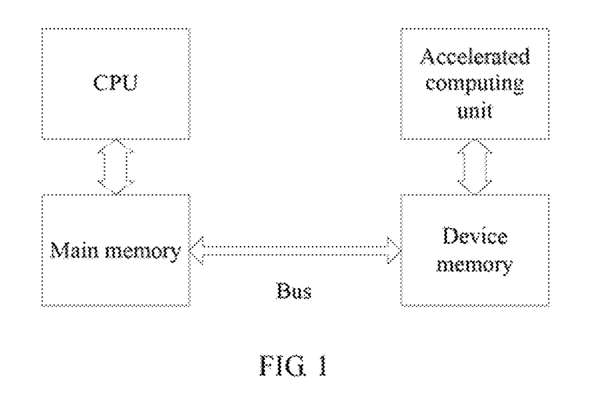
FIG. 1 is a schematic structural diagram of a computer architecture provided with an accelerated computation unit in the prior art.

As shown in FIG. 1, in a computer architecture including an accelerated computation unit, a CPU and the accelerated computation unit have respective storage units. Generally, a memory of the CPU is defined as a main memory and a memory of the accelerated computation unit is defined as a device memory, and data transmission between the main memory and the device memory is implemented by using a bus.

Figure 2:
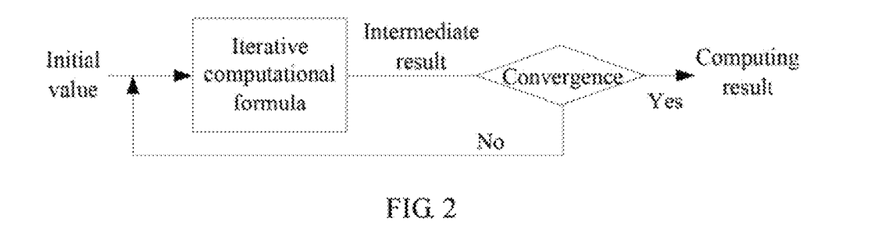
FIG. 2 is a block diagram of a principle of iterative computation.

Iterative computation is a typical intensive computation task. To improve computing efficiency, the iterative computation is usually implemented by being allocated to an accelerated computation unit. The iterative computation is generally applied in solving an equation set, solving matrix eigenvalues, singular value decomposition (SVD), and the like. As shown in FIG. 2, a basic idea of iterative computation is successive approximation. A rough initial value is selected, then a same iterative formula is used, and an intermediate result is repeatedly substituted into the iterative formula for loop computation, until a computation result converges to meet a precision requirement.

Because such an intensive computation task as the iterative computation has a very high requirement for data precision of the intermediate result, to implement effective computation convergence, data in a high-precision format is generally used in an accelerated computing process and also used in a data transmission process. Although a high-precision data format is used in the accelerated computing process and the data transmission process, and a requirement for computation precision is satisfied, the amount of data transmission is increased, the increased amount of data transmission leads to an increase in a delay of data transmission, and overall computation time for the CPU is also increased.

Figure 3:
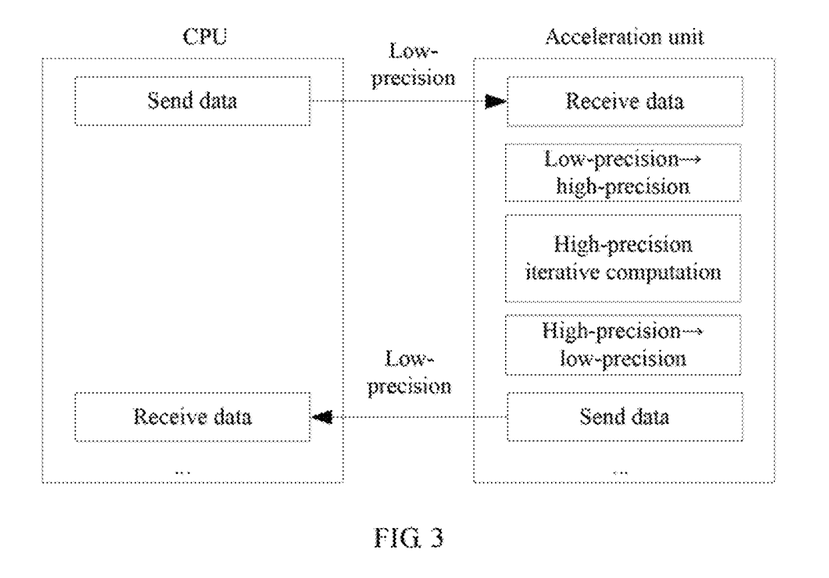
FIG. 3 is a schematic diagram of an accelerated computing process in the prior art.

In a solution of the prior art, as shown in FIG. 3, two data format conversion units, that is, a unit for converting high-precision data to low-precision data and a unit for converting low-precision data to high-precision data, are added into the accelerated computation unit, so that the CPU transmits low-precision data to the accelerated computation unit by using the bus. After receiving the low-precision data, the accelerated computation unit performs zero padding on the data to convert the data to a high-precision data format, and then performs computation. When the accelerated computation unit needs to transmit the data to the CPU, the accelerated computation unit converts the high-precision data to the low-precision data, and then sends the low-precision data to the CPU by using the bus.

In the foregoing solution of the prior art, the amount of data transmission is reduced by transmitting low-precision data, and further a delay of data transmission is decreased. However, because two data format conversion units are added into an accelerated computation unit, it is required to additionally occupy computing resources and computation time of the accelerated computation unit to perform data format conversion. Consequently, efficiency of accelerated computation is decreased.

SUMMARY

Embodiments of the present disclosure provide a data format conversion apparatus and method, and a buffer chip, to reduce an amount of data transmission between a main memory of a CPU and a device memory of an accelerated computation unit without additionally occupying computing resources of the accelerated computation unit and the CPU, so as to ensure computation precision and improve computation efficiency.

According to a first aspect, an embodiment of the present disclosure provides a data format conversion apparatus, where the apparatus is used on a buffer chip in a memory, and the apparatus includes a control module and a conversion module, where the control module is configured to send a control instruction to the conversion module according to the received data copy command, where the data copy command includes information about to-be-converted data, a format conversion type, and an address of the to-be-converted data, and the control instruction is used to instruct the conversion module to perform data format conversion and storage address mapping on the to-be-converted data; and the conversion module is configured to complete data format conversion and storage address mapping on the to-be-converted data according to the received control instruction, and send, to an accelerated computation unit, data obtained after data format conversion of the to-be-converted data.

In a first possible implementation manner of the first aspect, the completing data format conversion and storage address mapping on the to-be-converted data includes: storing, by the conversion module during writing, the to-be-converted data as data of a format conversion type indicated by the control instruction, and storing the data at a storage address indicated by the control instruction.

With reference to the first aspect or the first possible implementation manner of the first aspect, in a second possible implementation manner of the first aspect, the control instruction includes a control word stored in the mode selection register; and the control word includes a conversion mode enabling control word and a format conversion type control word, where the conversion mode enabling control word is used to instruct the conversion module to enable data format conversion of the to-be-converted data, or the conversion mode enabling control word is used to instruct the conversion module to disable data format conversion of the to-be-converted data; and the format conversion type control word is used to indicate a data format type of the to-be-converted data before conversion and a data format type of data obtained after conversion of the to-be-converted data.

With reference to the first aspect or the first possible implementation manner of the first aspect, in a third possible implementation manner of the first aspect, the control instruction includes a control code stored in the mode selection register, the control code is used to instruct the conversion module to enable data format conversion of the to-be-converted data, or to disable data format conversion of the to-be-convened data; or the control code is used to indicate a format conversion type of the to-be-converted data before conversion and a data format type of data obtained after conversion of the to-be-converted data.

With reference to the first aspect or the first to the third possible implementation manners of the first aspect, in a fourth possible implementation manner of the first aspect, the conversion module includes a data format conversion unit and an address conversion unit, where the data format conversion unit is configured to complete data format conversion on the to-be-converted data according to the control instruction sent by the control module; and the address conversion unit is configured to obtain, according to the control instruction, the storage address of the to-be-converted data before conversion, the data format type of the to-be-converted data before conversion, and the data format type of the data obtained after conversion of the to-be-converted data, a storage address of the data obtained after conversion of the to-be-converted data.

According to a second aspect, an embodiment of the present disclosure provides a buffer chip, including: a bus interface, an address buffer unit, a control buffer unit, a data buffer unit, and the apparatus according to any one possible implementation manner of the first aspect.

According to a third aspect, an embodiment of the present disclosure provides a data format conversion method, including:

receiving, by a bus interface of a buffer chip in a memory, a data copy command sent by a central processing unit CPU; and according to the data copy command, buffering to-be-converted data obtained by copying into a data buffer unit, buffering a storage address of the to-be-converted data into an address buffer unit, buffering a format conversion type of the to-be-converted data into a control buffer module, and sending the data copy command to a control module of a data format conversion apparatus, where the control module is configured to send a control instruction to a conversion module of the data format conversion apparatus according to the received data copy command, where the data copy command includes information about the to-be-converted data, the format conversion type, and the address of the to-be-converted data, and the control instruction is used to instruct the conversion module to perform data format conversion and storage address mapping on the to-be-converted data; and the conversion module completes data format conversion and storage address mapping on the to-be-converted data according to the received control instruction, and sends, to an accelerated computation unit, data obtained after data format conversion of the to-be-converted data.

In a first possible implementation manner of the third aspect, the control instruction includes a control word; and the control word includes a conversion mode enabling control word and a format conversion type control word, where the conversion mode enabling control word is used to instruct the conversion module to enable data format conversion of the to-be-converted data, or the conversion mode enabling control word is used to instruct the conversion module to disable data format conversion of the to-be-converted data; and the format conversion type control word is used to indicate a data format type of the to-be-converted data before conversion and a data format type of data obtained after conversion of the to-be-converted data.

In a second possible implementation manner of the third aspect, the control instruction includes a control code; and the control code is used to instruct the conversion module to enable data format conversion of the to-be-converted data, or to disable data format conversion of the to-be-converted data; or the control code is used to indicate a format conversion type of the to-be-converted data before conversion and a data format type of data obtained after conversion of the to-be-converted data.

With reference to the third aspect, or the first and the second possible implementation manners of the third aspect, in a third possible implementation manner of the third aspect, the completing, by the conversion module, data format conversion and storage address mapping on the to-be-converted data according to the received control instruction includes:

completing, by the conversion module, data format conversion on the to-be-converted data according to the control instruction sent by the control module, the format conversion type of the to-be-converted data before conversion, and the data format type of the data obtained after conversion of the to-be-converted data; and obtaining, by the conversion module according to the control instruction, the storage address of the to-be-converted data before conversion, the data format type of the to-be-converted data before conversion, and the data format type of the data obtained after conversion of the to-be-converted data, a storage address of the data obtained after conversion of the to-be-converted data.

With reference to the third aspect or the first to the third possible implementation manners of the third aspect, in a fourth possible implementation manner of the third aspect, the data copy command is defined as:

MemCopy(destination,source,size,direction,cpytype), where

MemCopy is a function name and represents a copy of the to-be-converted data between a main memory of the CPU and a device memory of the accelerated computation unit; destination represents a destination address of the to-be-converted data; source represents a source address of the to-be-converted data; size represents a size of the to-be-converted data; direction represents a copy direction of the to-be-converted data; and cpytype represents the format conversion type.

With reference to the third aspect or the first to the fourth possible implementation manners of the third aspect, in a fifth possible implementation manner of the third aspect, the completing data format conversion and storage address mapping on the to-be-converted data includes: storing, by the conversion module during writing, the to-be-converted data as data of a format conversion type indicated by the control instruction, and storing the data at a storage address indicated by the control instruction.

The present disclosure provides a data format conversion apparatus and method, and a buffer chip. The apparatus is used on a buffer chip in a memory; a control module of the data format conversion apparatus is configured to send a control instruction to a conversion module when receiving a data copy command; and the conversion module is configured to complete data format conversion and storage address mapping on to-be-converted data, and send, to an accelerated computation unit, data obtained after data format conversion of the to-be-converted data. A data format conversion apparatus is disposed on a buffer chip, thereby avoiding a prior-art problem of additionally occupying computing resources and computation time of an accelerated computation unit due to two data format conversion units disposed in the accelerated computation unit. This reduces the amount of data transmission between a main memory of a CPU and a device memory of the accelerated computation unit without additionally occupying computing resources of the accelerated computation unit and the CPU, ensures computation precision, and improves computation efficiency.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the an may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

As described in the background, in an existing accelerated computing system including an accelerated computation unit, there is a contradiction between data transmission efficiency and computation precision, in particular, a contradiction between data transmission efficiency and computation precision between a CPU and the accelerated computation unit. Therefore, the embodiments of the present disclosure provide a solution to the contradiction between data transmission efficiency and computation precision. In this way, data format conversion can be directly implemented in a data transmission process without additionally occupying computing resources, especially without additionally occupying computing resources of an accelerator; computation precision is ensured and overall computation efficiency of an accelerated computing system is improved.

The solution provided by the embodiments of the present disclosure may substitute the data format conversion solution mentioned in the background to resolve the contradiction between data transmission efficiency and computation precision, and can be applied to any scenario in which data format conversion is required, for example, a baseband processing part of a base station platform provided with an accelerator, a baseband processing part of a user terminal, and a data exchange part of a parallel or distributed computing system.

Generally, a memory of the accelerated computation unit is a synchronous dynamic random-access memory (SDRAM). The SDRAM memory module is formed by arranging several memory chips on a printed circuit board (PCB). An operating frequency of the SDRAM is relatively high, and signal transmission attenuation is relatively large. Therefore, a buffer chip is usually added onto the PCB for buffering and shaping signals of a data bus, an address bus, and a control bus. The buffer chip has been improved in the embodiments of the present disclosure, and a data format is directly converted in a data transmission process. In other words, to ensure data transmission efficiency, low-precision data should be transmitted; and to ensure overall computing efficiency, computing resources of an accelerator should not be occupied during data format conversion. Therefore, in the present disclosure, a data format conversion process is implemented in a device memory, so that the memory completes a data format conversion task during data reading and writing.

Figure 4:
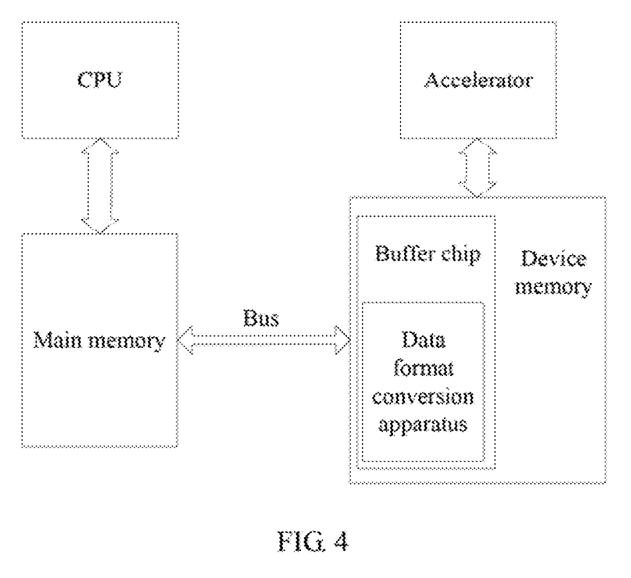
FIG. 4 is a schematic diagram of a computer architecture including a data format conversion apparatus according to an embodiment of the present disclosure.
Figure 5:
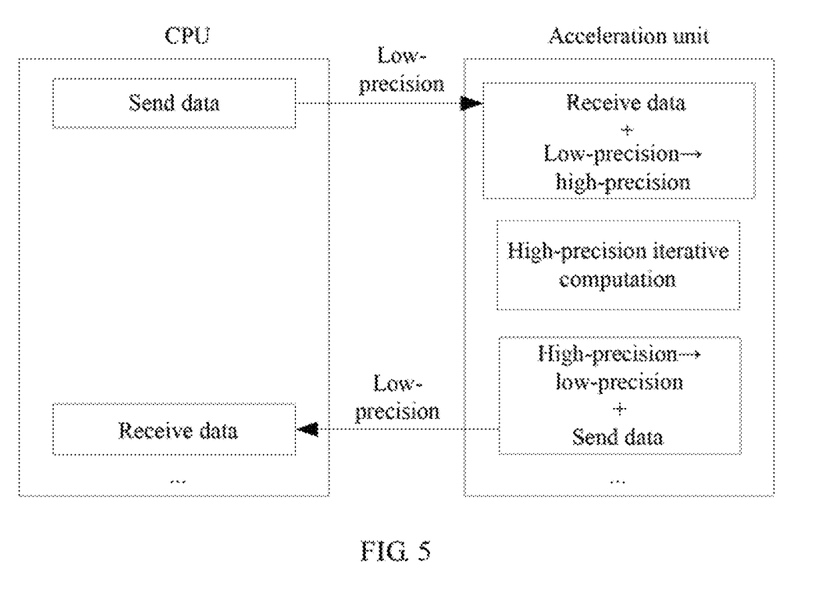
FIG. 5 is a schematic diagram of an accelerated computing process according to an embodiment of the present disclosure.

With reference to FIG. 4, a computer architecture including a data format conversion apparatus according to an embodiment of the present disclosure is described. In this embodiment of the present disclosure, the data format conversion apparatus is disposed on a buffer chip of a device memory of an accelerated computation unit, to implement a data format conversion function on the device memory in data reading and writing processes. An accelerated computing process in this case is shown in FIG. 5. Data format conversion from a low-precision format type to a high-precision format type can be implemented during data receiving, and data format conversion from a high-precision format type to a low-precision format type can be implemented during data sending. Regardless of receiving data or sending data, computing resources of the accelerated computation unit itself are not occupied, and it can be ensured that a relatively small amount of low-precision data is always transmitted on a bus between the device memory and a main memory.

The following describes the technical solutions provided in the embodiments of the present disclosure by using specific embodiments.

Figure 6:
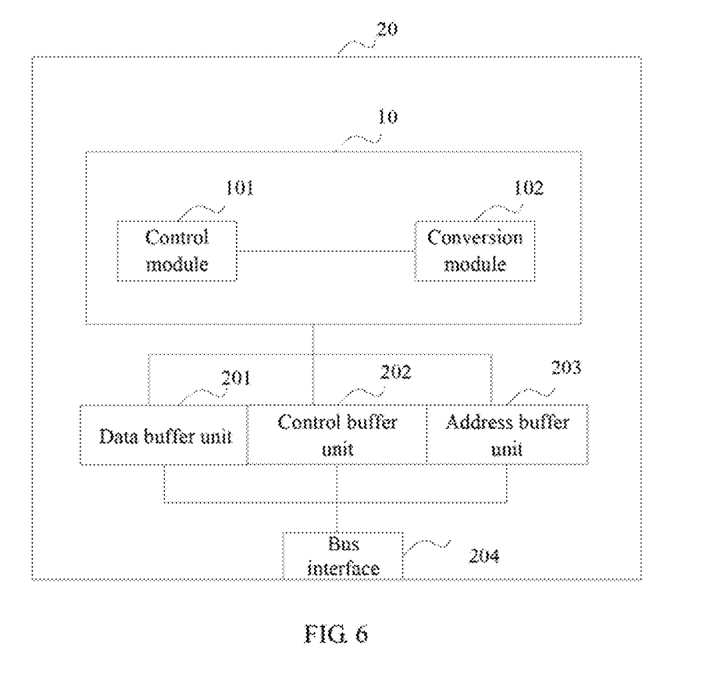
FIG. 6 is a schematic structural diagram of a buffer chip according to an embodiment of the present disclosure.

FIG. 6 is a schematic structural diagram of a buffer chip according to an embodiment of the present disclosure. Referring to FIG. 6, a buffer chip 20 provided by this embodiment may specifically include: a bus interface 204, an address buffer unit 203, a control buffer unit 202, a data buffer unit 201, and a data format conversion apparatus 10.

The bus interface 204 is configured to: receive a data copy command sent by a CPU; and according to the data copy command, buffer to-be-converted data obtained by copying into the data buffer unit 201, buffer a storage address of the to-be-converted data into the address buffer unit 203, buffer a format conversion type of the to-be-converted data into the control buffer unit 202, and send the data copy command to the data format conversion apparatus 10.

The data format conversion apparatus 10 includes a control module 101 and a conversion module 102.

The control module 101 is configured to obtain the to-be-converted data, the format conversion type, and the address of the to-be-converted data when receiving the data copy command, and send a control instruction to the conversion module 102, where the control instruction is used to instruct the conversion module 102 to perform data format conversion and storage address mapping on the to-be-converted data. The conversion module 102 is configured to complete data format conversion and storage address mapping on the to-be-converted data according to the received control instruction, and send, to an accelerated computation unit, data obtained after data format conversion of the to-be-converted data.

Optionally, the conversion module 102 directly stores, during writing, the to-be-converted data as data of a format conversion type indicated by the control instruction, and stores the data at a storage address indicated by the control instruction. In this way, in the data conversion apparatus, the to-be-converted data is stored as the data obtained after format conversion. During reading, the data after format conversion can be directly obtained. Therefore, data format conversion is completed in data reading and writing processes directly.

In an actual application, specifically, the control module 101 may be a mode selection register; the mode selection register is disposed in the buffer chip 20, and all control words or control codes required for control are pre-stored in the mode selection register.

The buffer chip 20 is a buffer chip in a memory. The foregoing data format conversion can be implemented in processes of memory reading and writing, without additionally occupying computing resources of an accelerator, thereby improving computation efficiency.

In one feasible implementation manner, the control instruction includes a control word stored in the mode selection register; the control word includes a conversion mode enabling control word and a format conversion type control word, the conversion mode enabling control word is used to instruct the conversion module 102 to enable data format conversion of the to-be-converted data, or the conversion mode enabling control word is used to instruct the conversion module 102 to disable data format conversion of the to-be-converted data. The format conversion type control word is used to indicate a data format type of the to-be-converted data before conversion and a data format type of data obtained after conversion of the to-be-converted data.

Figure 7:
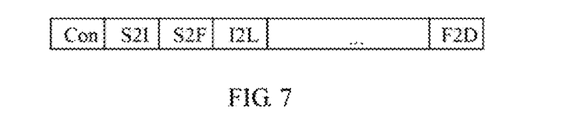
FIG. 7 is a schematic diagram of a mode selection register in a data format conversion apparatus on a buffer chip according to an embodiment of the present disclosure.

Referring to FIG. 7, in this embodiment, the conversion mode enabling control word may be set to Con. Enabling or disabling of data format conversion of the to-be-converted data may be indicated according to different values of Con. For example, when Con=1, it indicates that data format conversion of the to-be-converted data is to be enabled; when Con=0, it indicates that data format conversion of the to-be-converted data is to be disabled. Because there are only a few data format types in a computer, all the data format types can be enumerated, and all format conversion type control words can be set. For example, the format conversion type control word can be set to S2I, S2F, I2L, F2D, or the like, where S2I indicates conversion from a short type to an int type, S2F indicates conversion from a short type to a float type, I2L indicates conversion from an int type to a long int type, and F2D indicates conversion from a float type to a double type. When one of the format conversion type control words is set to 1, it indicates that corresponding format conversion is to be performed; and other format conversion type control words are set to 0. For example, when the format conversion type control word S2I is set to 1, a data format of the to-be-converted data is converted from a short type to an int type, and in this case, the format conversion type control words S2F, I2L, and F2D are all set to 0.

In another feasible implementation manner, the control instruction includes all the control codes pre-stored in the mode selection register; the control code is used to instruct the conversion module 102 to enable data format conversion of the to-be-converted data, or to disable data format conversion of the to-be-converted data; or the control code is used to indicate a format conversion type of the to-be-converted data before conversion and a data format type of data obtained after conversion of the to-be-converted data.

For example, in actual use, it may be specified that: A control code 0000 indicates disabling of data format conversion of the to-be-converted data, a control code 1111 indicates enabling of data format conversion of the to-be-converted data, a control code 0001 indicates conversion from a short type to an int type, a control code 0010 indicates conversion from a short type to a float type, and a control code 0011 indicates conversion from an int type to a long int type. This embodiment sets no limitation thereto.

In this embodiment, two methods may be used to transmit the control instruction from an application program to the mode selection register. One method is to add a dedicated configuration line into the memory, and add the configuration line into a control line of the bus, where a user can implement writing of the control instruction by using the configuration line, and in this method, a hardware interface of the memory needs to be modified. The other method is to use an existing control line in the memory or reuse an existing control line in the memory to modify a control line protocol, and add a transmission process of the control instruction into an existing control line protocol.

Further, for convenience of user's programming use, this embodiment provides a same data copy command, where the data copy command is actually an interface function for encapsulating a function of the foregoing data format conversion apparatus 10. In actual use, a user only needs to call the interface function to implement data conversion. In this embodiment, the interface function, that is, the data copy command, is defined as:

MemCopy(destination,source,size,direction,cpytype), where

MemCopy is a function name and represents a copy of the to-be-converted data between a main memory and a device memory; destination represents a destination address of the to-be-converted data; source represents a source address of the to-be-converted data; size represents a size of the to-be-converted data; direction represents a copy direction of the to-be-converted data: from the main memory to the device memory, from the device memory to the main memory, or from one device memory to another device memory; and cpytype represents a format conversion type, such as S2I, S2F, or I2L, and is corresponding to the control instruction.

It should be noted that, in this embodiment, the conversion module 102 may convert the to-be-converted data from a low-precision format type to a high-precision format type according to the received control instruction, or convert the to-be-converted data from a high-precision format type to a low-precision format type. During data format conversion, because the data format type changes, required storage space changes. Correspondingly, the conversion module 102 further needs to complete storage address mapping of the to-be-converted data according to the control instruction.

Specifically, the conversion module 102 may include a data format conversion unit and an address conversion unit. The data format conversion unit is configured to complete data format conversion of the to-be-converted data according to the control instruction sent by the control module 101; and the address conversion unit is configured to obtain, according to the control instruction, the storage address of the to-be-converted data before conversion, the data format type of the to-be-converted data before conversion, and the data format type of the data obtained after conversion of the to-be-converted data, a storage address of the data obtained after conversion of the to-be-converted data.

In an actual data format conversion process, if the to-be-converted data is converted from a low-precision format type to a high-precision format type, the data format conversion unit correspondingly increases a bit width of a data format by performing zero padding of high-bit part and keeping original data of a low-bit part; and if the to-be-converted data is converted from a high-precision format type to a low-precision format type, the data format conversion unit correspondingly decreases a bit width of a data format by directly truncating the low-bit part.

When the data format type changes, its storage space changes correspondingly. If the to-be-converted data is converted from a low-precision format type to a high-precision format type, required storage space is increased; and if the to-be-converted data is converted from a high-precision format type to a low-precision format type, the required storage space is decreased. Therefore, a storage address corresponding to each piece of data changes. After receiving the control instruction, the address conversion unit can obtain, through computation according to the storage address of the to-be-converted data before conversion and data format types before and after the conversion, a storage address corresponding to data obtained after conversion of each piece of to-be-converted data.

For example, it is assumed that an accelerated computation unit is a GPGPU. In a computation process, a CPU allocates an SVD decomposition process to the GPGPU for implementation. In an SVD computation process, two data exchanges are required in total: one is to transmit an initial value from a main memory to a device memory when the computation starts; the other is to transmit a computation result from the device memory to the main memory when the computation ends. It is assumed that data transmitted and received by the main memory is of a short type, and data used by the GPGPU for computing is of a double type. That is, when the computation starts, an initial value of a short type is required to be converted to data of a double type, and when the computation ends, a computation result of a double type is required to be converted to a short type. For a user, the interface function provided by this embodiment only needs to be called twice in the two data transmission processes.

Figure 8:
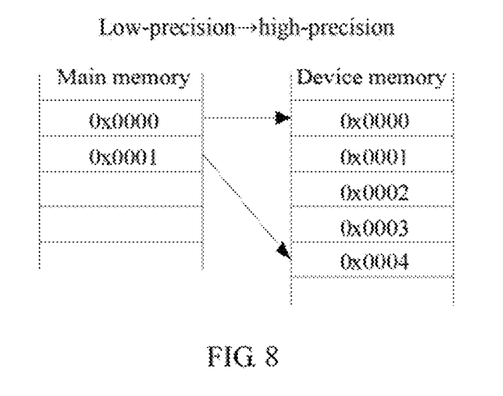
FIG. 8 is schematic diagram 1 of storage address mapping in a data format conversion process according to an embodiment of the present disclosure.
Figure 9:
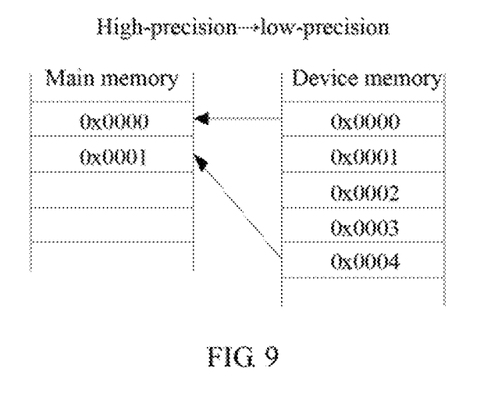
FIG. 9 is schematic diagram 2 of storage address mapping in a data format conversion process according to an embodiment of the present disclosure.

When the computation starts, the following interface function is called: MemCopy (destination, source, size, Host2Device, short2double). It is assumed that storage addresses corresponding to data, of a short type, stored in the main memory are 0 and 1 respectively, after the data of a short type is converted to data of a double type, storage addresses of the data, of a double type, stored in the device memory are mapped to 0 and 4 respectively, as shown in FIG. 8. When the computation ends, the following interface function is called: MemCopy (destination, source, size, Device2Host, double2short), and the storage addresses of the data, of a double type, stored in the device memory are 0 and 4 respectively. After the data of a double type is converted to the data of a short type, the storage addresses of the data, of a short type, stored in the main memory are mapped to 0 and 1 respectively, as shown in FIG. 9.

In a process of performing accelerated computation by applying the accelerated computation unit of the data format conversion apparatus 10 provided by this embodiment, during data receiving, data format conversion from a low-precision format type to a high-precision format type can be implemented by the data format conversion apparatus 10 in the buffer chip on the memory of the accelerated computation unit. During data sending, data format conversion from a high-precision format type to a low-precision format type can be implemented by the data format conversion apparatus 10 in the buffer chip on the memory of the accelerated computation unit. It can be seen that regardless of sending data or receiving data, computing resources of an accelerator itself are not occupied, and it can be ensured that data transmitted on the bus between the main memory and the device memory is always a relatively small amount of low-precision data.

In addition, computation and conversion of a to-be-converted data block with a size of 64*14*2048 is used as an example for time comparison. In the prior art, in a GPU, 300 us is required for conversion from data of a short type to data of a float type, and 300 us is also required for conversion from data of a float type to data of a short type. With the data format conversion apparatus 10 in this embodiment, only a few clock cycles are required in data reading and writing processes if data format conversion is implemented in a memory buffer. Assuming that a clock frequency of a memory module is 1600 MHz, both conversion from data of a short type to data of a float type and conversion from data of a float type to data of a short type can be implemented in time of an ns order of magnitude. It can be seen that the data format conversion apparatus 10 in this embodiment can greatly shorten overall computation time of data.

Figure 10A:
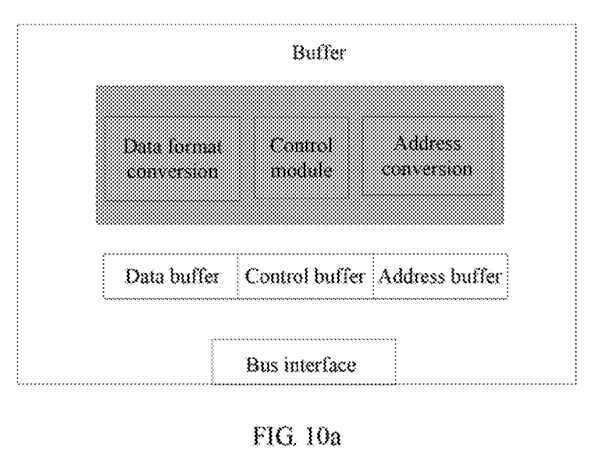
FIG. 10a is a schematic structural diagram of another buffer chip according to an embodiment of the present disclosure.

Optionally, modules for implementing a function of data format conversion by the buffer chip in the memory may include three parts: a data format conversion module, an address conversion module, and a control module, as shown in FIG. 10*a*. The buffer further includes a bus interface, a data buffer, a control buffer, and an address buffer. Three newly-added modules in a gray part of FIG. 10a are separately described in the following.

The data format conversion module is configured to convert a data format, that is, convert low-precision data to high-precision data during writing, and convert the high-precision data to the low-precision data during reading.

The address conversion module is configured to map address space to implement mapping between memory space of a CPU and memory space of an accelerator.

The control module is configured to control a data format conversion process, mainly including whether to perform format conversion and a manner of performing format conversion.

The three modules are further described in the following.

(1) Data Format Conversion Module

The data format conversion module completes data format conversion according to an instruction of the control module, where there may be three specific operating modes:

converting data from a low-precision type to a high-precision type, that is, increasing a bit width of a data format by performing zero padding of a high-bit part and keeping original data of a low-bit part;

converting data from a high-precision type to a low-precision type, that is, decreasing a bit width of a data format by directly truncating a low-bit part; and skipping performing data format conversion;

operating mode selection of this module, a specific data format conversion mode, and a data type after conversion are implemented according to a control word in the instruction of the control module.

(2) Address Conversion Module

Because a data format changes, storage space occupied for data storage changes: if data is convened from a low-precision type to a high-precision type, required storage space is increased; and if data is converted from a high-precision type to a low-precision type, the required storage space is decreased. Therefore, a storage address corresponding to each piece of data changes. A function of the address conversion module is to complete, according to the instruction of the control module, mapping of address space of data obtained before and after data format conversion, that is, to perform computation to obtain an address of each piece of converted data according to an address of data before conversion and data formats before and after conversion.

(3) Control Module

A function of the control module is to implement control of the data format conversion module and the address conversion module, and its specific implementation manner can be implemented by adding a mode selection register in a buffer chip; the register includes all required control words, and a mode selection register similar to that in FIG. 7 may be used. Con is a conversion mode enabling control word. Con=1 indicates enabling of data format conversion, and Con=0 indicates disabling of data format conversion. Each of S2I, S2F, I2L, F2D, and the like indicates a format conversion type, for example, S2I indicates conversion from a short type to an int type, S2F indicates conversion from a short type to a float type, I2L indicates conversion from an int type to a long int type, and F2D indicates conversion from a float type to a double type. Because there are only a few data format types in a computer, a control word may be set by using an enumeration method. If the control word is 1, it indicates that corresponding format type conversion is to be performed; and other control words are zero.

The foregoing mode selection register may be alternatively implemented in another manner, for example, an encoding manner may be used. It is specified that: 0000 indicates no format conversion is to be performed, 0001 indicates conversion from a short type to an int type, 0010 indicates conversion from a short type to a float type, 0011 indicates conversion from an int type to a long int type, and the like.

Optionally, the address conversion module may be integrated into the data format conversion module to complete data format conversion in the memory by performing data reading and writing by directly using the data format conversion module, so that computing resources of an accelerator are not occupied, and overall computation efficiency is improved.

In the foregoing three newly added modules, the control module implements control of the data format conversion module and the address conversion module by using control words in the mode selection register. With regard to how the control words are transmitted from an application program to the mode selection register, the present disclosure proposes two methods.

The first method is to add a dedicated configuration line on the memory, and add the configuration line into a control line of the bus. A user implements writing of a control word by using this dedicated configuration line. This method needs to modify a hardware interface of the memory.

The second method is to use an existing control line in the memory to modify a control line protocol, and increase a control word transmission process. This method does not need to modify the hardware interface of the memory and is relatively easy to implement.

Further, this embodiment of the present disclosure further provides an API interface corresponding to data format conversion, which is used to provide a same user interface. By using this interface, a user can call the conversion module proposed by the present disclosure, so as to implement data format conversion.

In the technical solution of this embodiment, the buffer chip includes a bus interface, an address buffer unit, a control buffer unit, a data buffer unit, and a data format conversion apparatus. The bus interface is configured to: receive a data copy command sent by a CPU; forward the data copy command to a data format conversion apparatus; and according to the data copy command, buffer to-be-converted data obtained by copying into the data buffer unit, and buffer a storage address and a format conversion type of the to-be-converted data into the address buffer unit and the control buffer unit respectively. A control module of the data format conversion apparatus is configured to send a control instruction to a conversion module when receiving the data copy command; and the conversion module is configured to complete data format conversion and storage address mapping on the to-be-convened data according to the received control instruction, and send, to the accelerated computation unit, data obtained after data format conversion of the to-be-converted data. A data format conversion apparatus is disposed on a buffer chip, thereby avoiding a prior-art problem of additionally occupying computing resources and computation time of an accelerated computation unit due to two data format conversion units disposed in the accelerated computation unit. This reduces the amount of data transmission between a main memory of a CPU and a device memory of the accelerated computation unit without additionally occupying computing resources of the accelerated computation unit and the CPU, ensures computation precision, and improves computation efficiency.

Figure 10B:
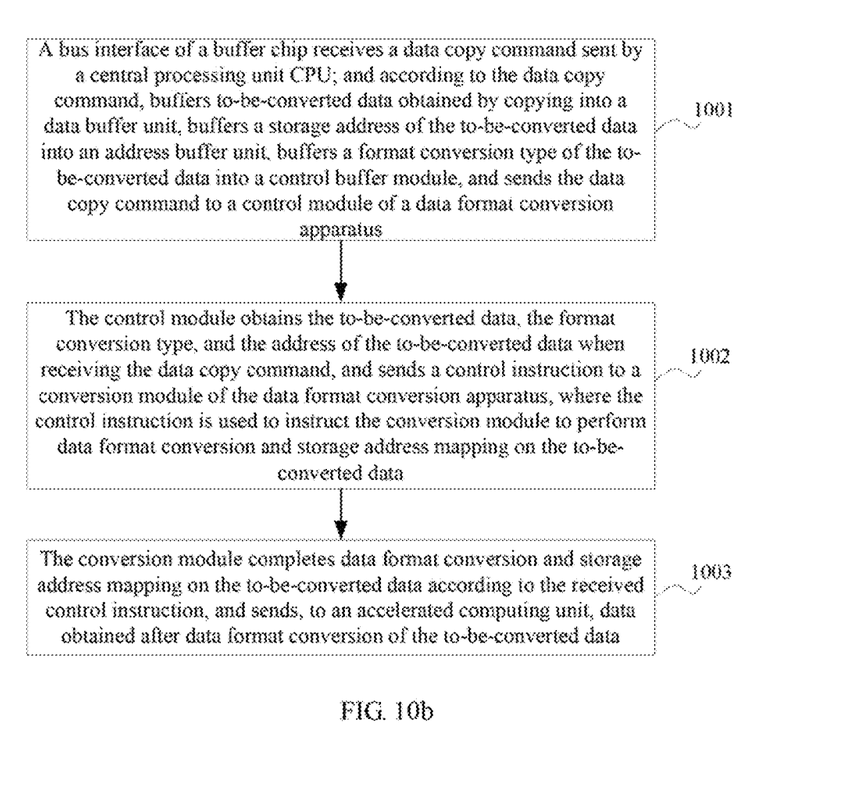
FIG. 10b is a flowchart of a data format conversion method according to an embodiment of the present disclosure.

FIG. 10b is a flowchart of a data format conversion method according to an embodiment of the present disclosure. As shown in FIG. 10b, the method provided in this embodiment can be specifically executed by the buffer chip 20 provided in the foregoing embodiment, and the method provided in this embodiment may specifically include the following steps.

S1001: A bus interface of the buffer chip receives a data copy command sent by a central processing unit CPU; and according to the data copy command, buffers to-be-converted data obtained by copying into a data buffer unit, buffers a storage address of the to-be-converted data into an address buffer unit, buffers a format conversion type of the to-be-converted data into a control buffer module, and sends the data copy command to a control module of a data format conversion apparatus.

S1002: The control module obtains the to-be-converted data, the format conversion type, and the address of the to-be-convened data when receiving the data copy command, and sends a control instruction to a conversion module of the data format conversion apparatus, where the control instruction is used to instruct the conversion module to perform data format conversion and storage address mapping on the to-be-converted data.

Alternatively, S1002: The control module sends a control instruction to a conversion module of the data format conversion apparatus according to the received data copy command, where the data copy command includes information about the to-be-converted data, the format conversion type, and the address of the to-be-converted data; and the control instruction is used to instruct the conversion module to perform data format conversion and storage address mapping on the to-be-converted data.

S1003: The conversion module completes data format conversion and storage address mapping on the to-be-converted data according to the received control instruction, and sends, to an accelerated computation unit, data obtained after data format conversion of the to-be-converted data.

In this step, during data format conversion, the conversion module completes data format conversion on the to-be-converted data according to the control instruction sent by the control module, a format conversion type of the to-be-converted data before conversion, and a data conversion type of data obtain after conversion of the to-be-converted data. During storage address mapping, the conversion module obtains, according to the control instruction, the storage address of the to-be-converted data before conversion, the data format type of the to-be-converted data before conversion, and the data format type of the data obtained after conversion of the to-be-converted data, a storage address of the data obtained after conversion of the to-be-converted data.

Specifically, the control instruction includes a control word; the control word includes a conversion mode enabling control word and a format conversion type control word; the conversion mode enabling control word is used to instruct the conversion module to enable data format conversion of the to-be-converted data, or the conversion mode enabling control word is used to instruct the conversion module to disable data format conversion of the to-be-convened data; and the format conversion type control word is used to indicate the data format type of the to-be-converted data before conversion and the data format type of the data obtained after conversion of the to-be-converted data.

Specifically, the control instruction includes a control code, and the control code is used to instruct the conversion module to enable data format conversion of the to-be-converted data, or to disable data format conversion of the to-be-converted data; or the control code is used to indicate the format conversion type of the to-be-converted data before conversion and the data format type of the data obtained after conversion of the to-be-converted data.

The data copy command in this embodiment is defined as:
MemCopy(destination,source,size,direction,cpytype),
where
MemCopy is a function name and represents a copy of the to-be-converted data between a main memory of the CPU and a device memory of the accelerated computation unit; destination represents a destination address of the to-be-converted data; source represents a source address of the to-be-converted data; size represents a size of the to-be-converted data; direction represents a copy direction of the to-be-converted data; and cpytype represents the format conversion type.

Optionally, the completing data format conversion and storage address mapping on the to-be-converted data may include: during writing, directly storing the to-be-converted data as data of a format conversion type indicated by the control instruction, and storing the data at a storage address indicated by the control instruction. In this way, in the data format conversion apparatus, the to-be-converted data is stored as data obtained after format conversion, and the data obtained after the format conversion can be obtained directly during reading. Therefore, data format conversion is completed in data reading and writing processes directly.

The buffer chip is a buffer chip in the memory. The foregoing data format conversion can be implemented in processes of memory reading and writing, without additionally occupying computing resources of an accelerator, thereby improving computation efficiency.

The data format conversion method provided in this embodiment may be used for implementing the technical solutions in the foregoing apparatus embodiments. Implementation principles and technical effects thereof are similar, and details are not described herein again.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data format conversion apparatus, wherein
the apparatus is used on a buffer chip in a memory, and the apparatus comprises a control module and a conversion module, wherein
the control module is configured to send a control instruction to the conversion module according to a received data copy command, wherein the data copy command comprises information about to-be-converted data, a format conversion type, and an address of the to-be-converted data, and the control instruction is used to instruct the conversion module to perform data format conversion and storage address mapping on the to-be-converted data; and
the conversion module is configured to complete data format conversion and storage address mapping on the to-be-converted data according to the received control instruction, and send converted data to an accelerated computation unit, wherein the converted data is data obtained after data format conversion of the to-be-converted data.

2. The apparatus according to claim 1, wherein the conversion module is configured to complete data format conversion and storage address mapping on the to-be-converted data comprises: the conversion module is configured to store, during writing, the to-be-converted data as data of a data format type corresponding to a format conversion type indicated by the control instruction, and the data at a storage address indicated by the control instruction.

3. The apparatus according to claim 1, wherein the control instruction comprises a control word stored in a mode selection register and the control word comprises a conversion mode enabling control word and a format conversion type control word, wherein
the conversion mode enabling control word is used to instruct the conversion module to enable data format conversion of the to-be-converted data, or the conversion mode enabling control word is used to instruct the conversion module to disable data format conversion of the to-be-converted data; and
the format conversion type control word is used to indicate a data format type of the to-be-converted data before conversion and a data format type of the converted data.

4. The apparatus according to claim 1, wherein the control instruction comprises a control code stored in a mode selection register, the control code is used to instruct the conversion module to enable data format conversion of the to-be-converted data, or to disable data format conversion of the to-be-converted data; or the control code is used to indicate a data format type of the to-be-converted data before conversion and a data format type of the converted data.

5. The apparatus according to claim 1, wherein the conversion module comprises a data format conversion unit and an address conversion unit, wherein
the data format conversion unit is configured to complete data format conversion on the to-be-converted data according to the control instruction sent by the control module; and
the address conversion unit is configured to obtain, according to the control instruction, the storage address of the to-be-converted data before conversion, the data format type of the to-be-converted data before conversion, and the data format type of the converted data, a storage address of the converted data.

6. The apparatus according to claim 1, wherein the data copy command is defined as:
MemCopy(destination,source,size,direction,cpytype), wherein
MemCopy is a function name and represents a copy of the to-be-converted data between a main memory of the CPU and a device memory of the accelerated computation unit; destination represents a destination address of the to-be-converted data; source represents a source address of the to-be-converted data; size represents a size of the to-be-converted data; direction represents a copy direction of the to-be-converted data; and cpytype represents the format conversion type.

7. A data format conversion method, comprising:
receiving, by a bus interface of a buffer chip in a memory, a data copy command sent by a central processing unit CPU; and according to the data copy command, buffering to-be-converted data obtained by copying into a data buffer unit, buffering a storage address of the to-be-converted data into an address buffer unit, buffering a format conversion type of the to-be-converted data into a control buffer module, and sending the data copy command to a control module of a data format conversion apparatus;
sending, by the control module, a control instruction to a conversion module of the data format conversion apparatus according to the received data copy command, wherein the data copy command comprises information about the to-be-converted data, the format conversion type, and the address of the to-be-converted data, and the control instruction is used to instruct the conversion module to perform data format conversion and storage address mapping on the to-be-converted data; and
completing, by the control module, data format conversion and storage address mapping on the to-be-converted data according to the received control instruction, and sending converted data to an accelerated computation unit, wherein the converted data is data obtained after data format conversion of the to-be-converted data.

8. The method according to claim 7, wherein the control instruction comprises a control word; and the control word comprises a conversion mode enabling control word and a format conversion type control word, wherein the conversion mode enabling control word is used to instruct the conversion module to enable data format conversion of the to-be-converted data, or the conversion mode enabling control word is used to instruct the conversion module to disable data format conversion of the to-be-converted data; and the format conversion type control word is used to indicate a data format type of the to-be-converted data before conversion and a data format type of the converted data.

9. The method according to claim 7, wherein the control instruction comprises a control code; and the control code is used to instruct the conversion module to enable data format conversion of the to-be-converted data, or to disable data format conversion of the to-be-converted data; or the control code is used to indicate a data format type of the to-be-converted data before conversion and a data format type of the converted data.

10. The method according to claim 7, wherein the completing, by the conversion module, data format conversion and storage address mapping on the to-be-converted data according to the received control instruction comprises:

completing, by the conversion module, data format conversion on the to-be-converted data according to the control instruction sent by the control module, the data format type of the to-be-converted data before conversion, and the data format type of the converted data; and obtaining, by the conversion module according to the control instruction, the storage address of the to-be-converted data before conversion, the data format type of the to-be-converted data before conversion, and the data format type of the converted data, a storage address of the converted data.

11. The method according to claim 7, wherein the data copy command is defined as:

MemCopy(destination,source,size,direction,cpytype), wherein

MemCopy is a function name and represents a copy of the to-be-converted data between a main memory of the CPU and a device memory of the accelerated computation unit; destination represents a destination address of the to-be-converted data; source represents a source address of the to-be-converted data; size represents a size of the to-be-converted data; direction represents a copy direction of the to-be-converted data; and cpytype represents the format conversion type.

12. The method according to claim 7, wherein the completing data format conversion and storage address mapping on the to-be-converted data comprises: storing, by the conversion module during writing, the to-be-converted data as data of a format conversion type indicated by the control instruction, and storing the data at a storage address indicated by the control instruction.

13. A buffer chip, comprising: a bus interface, an address buffer unit, a control buffer unit, a data buffer unit, and a apparatus, wherein the apparatus comprises: s a control module and a conversion module, wherein the control module is configured to send a control instruction to the conversion module according to a received data copy command, wherein the data copy command comprises information about to-be-converted data, a format conversion type, and an address of the to-be-convened data, and the control instruction is used to instruct the conversion module to perform data format conversion and storage address mapping on the to-be-converted data; and the conversion module is configured to complete data format conversion and storage address mapping on the to-be-converted data according to the received control instruction, and send converted data to an accelerated computation unit, wherein the converted data is data obtained after data format conversion of the to-be-converted data.

14. The buffer chip according to claim 13, wherein the conversion module is configured to complete data format conversion and storage address mapping on the to-be-converted data comprises: the conversion module is configured to store, during writing, the to-be-converted data as data of a data format type corresponding to a format conversion type indicated by the control instruction, and the data at a storage address indicated by the control instruction.

15. The buffer chip according to claim 13, wherein the control instruction comprises a control word stored in a mode selection register; and the control word comprises a conversion mode enabling control word and a format conversion type control word, wherein the conversion mode enabling control word is used to instruct the conversion module to enable data format conversion of the to-be-converted data, or the conversion mode enabling control word is used to instruct the conversion module to disable data format conversion of the to-be-converted data; and the format conversion type control word is used to indicate a data format type of the to-be-converted data before conversion and a data format type of the converted data.

16. The buffer chip according to claim 13, wherein the control instruction comprises a control code stored in a mode selection register, the control code is used to instruct the conversion module to enable data format conversion of the to-be-converted data, or to disable data format conversion of the to-be-converted data; or the control code is used to indicate a data format type of the to-be-converted data before conversion and a data format type of the converted data.

17. The buffer chip according to claim 13, wherein the conversion module comprises a data format conversion unit and an address conversion unit, wherein the data format conversion unit is configured to complete data format conversion on the to-be-converted data according to the control instruction sent by the control module; and the address conversion unit is configured to obtain, according to the control instruction, the storage address of the to-be-converted data before conversion, the data format type of the to-be-converted data before conversion, and the data format type of the converted data, a storage address of the converted data.

18. The buffer chip according to claim 13, wherein the data copy command is defined as:

MemCopy(destination,source,size,direction,cpytype), wherein

MemCopy is a function name and represents a copy of the to-be-converted data between a main memory of the CPU and a device memory of the accelerated computation unit; destination represents a destination address of the to-be-converted data; source represents a source address of the to-be-converted data; size represents a size of the to-be-converted data; direction represents a copy direction of the to-be-converted data; and cpytype represents the format conversion type.

* * * * *

UNITED STATES PATENT AND TRADEMARK OFFICE
CERTIFICATE OF CORRECTION

PATENT NO. : 10,402,119 B2
APPLICATION NO. : 15/789011
DATED : September 3, 2019
INVENTOR(S) : Shougang Chai et al.

It is certified that error appears in the above-identified patent and that said Letters Patent is hereby corrected as shown below:

In the Claims

In Column 18, Lines 5-6:
In Claim 13, after "address of the," delete "to-be-convened" and insert -- to-be-converted --, therefor.

Signed and Sealed this
Thirty-first Day of December, 2019

Andrei Iancu
*Director of the United States Patent and Trademark Office*